United States Patent
Windeballe et al.

(10) Patent No.: US 7,130,420 B2
(45) Date of Patent: Oct. 31, 2006

(54) ACOUSTIC TRANSDUCER ASSEMBLY

(75) Inventors: Lars Windeballe, Copenhagen (DK); Peter Thorndahl, Holbaek (DK)

(73) Assignee: Nokia Mobile Phones Limited, Espoo (FI)

( * ) Notice: Subject to any disclaimer, the term of this patent is extended or adjusted under 35 U.S.C. 154(b) by 381 days.

(21) Appl. No.: 10/101,625

(22) Filed: Mar. 21, 2002

(65) Prior Publication Data
US 2002/0136399 A1    Sep. 26, 2002

(30) Foreign Application Priority Data
Mar. 21, 2001 (GB) .................... 0107071.3

(51) Int. Cl.
*H04M 1/00* (2006.01)
(52) U.S. Cl. .................... 379/433.03; 379/433.02; 381/345
(58) Field of Classification Search .......... 379/433.02, 379/433.03, 420.03, 433.01; 455/90.3; 381/344, 381/345, 355, 360, 365, 368, 386, 392, 395; 439/620
See application file for complete search history.

(56) References Cited

U.S. PATENT DOCUMENTS 4,130,740 A * 12/1978 Cogan .................. 379/433.02
4,984,268 A    1/1991 Brown et al.
5,210,793 A    5/1993 Carlson et al.
5,836,790 A * 11/1998 Barnett .................... 439/620
6,647,118 B1 * 11/2003 Miura et al. .......... 379/433.03

FOREIGN PATENT DOCUMENTS

GB      1479072       6/1975
GB      2249691 A     5/1992
WO      86-2508 A1    4/1986

OTHER PUBLICATIONS

European Search Report, Application No. GB 0107071.3, one page, dated Nov. 13, 2001.

* cited by examiner

*Primary Examiner*—Jefferey F. Harold
(74) *Attorney, Agent, or Firm*—Alston & Bird LLP

(57) ABSTRACT

An acoustic transducer assembly comprising an acoustic transducer body having one or more apertures through which an audio signal is passed. Two housing parts when assembled provides a acoustic transducer cavity for containing the acoustic transducer body and a resilient sealing gasket, and the acoustic transducer cavity has a sound passage through the housing wall. The resilient sealing gasket provides a channel for transferring said audio signal from said one or more apertures to the sound passage through the housing wall. The housing parts have an inclined wall part that transfers a biasing force originating from the two housing parts and acting on the acoustic transducer body to a force acting on the resilient sealing gasket in order to provide a sealing between the resilient sealing gasket and the sound passage through the housing wall.

17 Claims, 4 Drawing Sheets

ACOUSTIC TRANSDUCER ASSEMBLY

BACKGROUND OF THE INVENTION

1. Field of the Invention

The invention relates to an acoustic transducer assembly comprising two housing parts providing an acoustic transducer cavity containing the acoustic transducer body and a resilient sealing gasket. The acoustic transducer cavity has a sound passage through the housing wall.

2. Description of the Prior Art

This kind of acoustic transducer is frequently used as acoustic sources, for example providing alerting signals for mobile telephones. For example when the acoustic transducer is used as a buzzer for a mobile telephone, a sound pressure at 10 cm distance in the level of 100 dB or even higher is required by some operators in order to be able to hear the alerting in noisy conditions. For achieving this sound level the buzzer frequency is tuned to the resonance frequency of the buzzer. Furthermore a resilient sealing gasket is provided in order to guide the acoustic energy from the transducer directly from the outlet on the transducer body to the acoustic openings on the housing of the mobile telephone. If the acoustic energy is leaked into the phone housing, the effective acoustic energy passing through the acoustic openings on the housing is reduced. This affects the loudness of the buzzer signal.

However mobile telephones are getting smaller and smaller. This also reduces the space for the transducer cavity. It is difficult to obtain a sufficiently effective sealing of the acoustic path from the outlet on the transducer body to the acoustic openings on the housing of the mobile telephone.

SUMMARY OF THE INVENTION

According to a first aspect of the invention there is provided a method of assembling an acoustic transducer assembly. This method comprises steps of placing an acoustic transducer body and the seating gasket in a first housing part having a recess for loosely receiving the acoustic transducer body and the sealing gasket, and having an inclined watt part; placing a second housing part as a lid for closing the recess; and biasing the two housing parts towards each other, whereby the inclined wall part transfers a biasing force to a force acting on the resilient sealing gasket in order to provide a sealing between the resilient sealing gasket and a sound passage through the housing wall. Hereby the inclined wall part transfers the biasing force in one direction to a force into a sealing force in another direction. The biasing force provided when the Printed Circuit Board is screwed onto the front cover will be in the direction of the screw towers. The required force to ensure a sufficient sealing will be transverse to the biasing force. The acoustic openings are in the side of the terminal. This is advantageous from a manufacturing point of view.

According to a further aspect of the invention, there is provided an acoustic transducer assembly comprising an acoustic transducer body having one or more apertures through which an audio signal is passed; two housing parts when assembled provide a acoustic transducer cavity for containing the acoustic transducer body and a resilient sealing gasket, the acoustic transducer cavity has a sound passage through the housing wall; the resilient sealing gasket providing a channel for transferring the audio signal from the one or more apertures to the sound passage through the housing wall; and the housing parts have an inclined wall part that transfers a biasing force originating from the two housing parts and acting on the acoustic transducer body to a force acting on the resilient sealing gasket in order to provide a sealing between the resilient sealing gasket and the sound passage through the housing wall.

According to a further aspect of the invention a mobile telephone is provided an acoustic transducer assembly according to the invention as a buzzer.

BRIEF DESCRIPTION OF THE DRAWINGS

For a better understanding of the present invention and to understand how the same may be brought into effect reference will now be made, by way of example only, to accompanying drawings, in which.

DETAILED DESCRIPTION OF THE INVENTION

Figure 1:
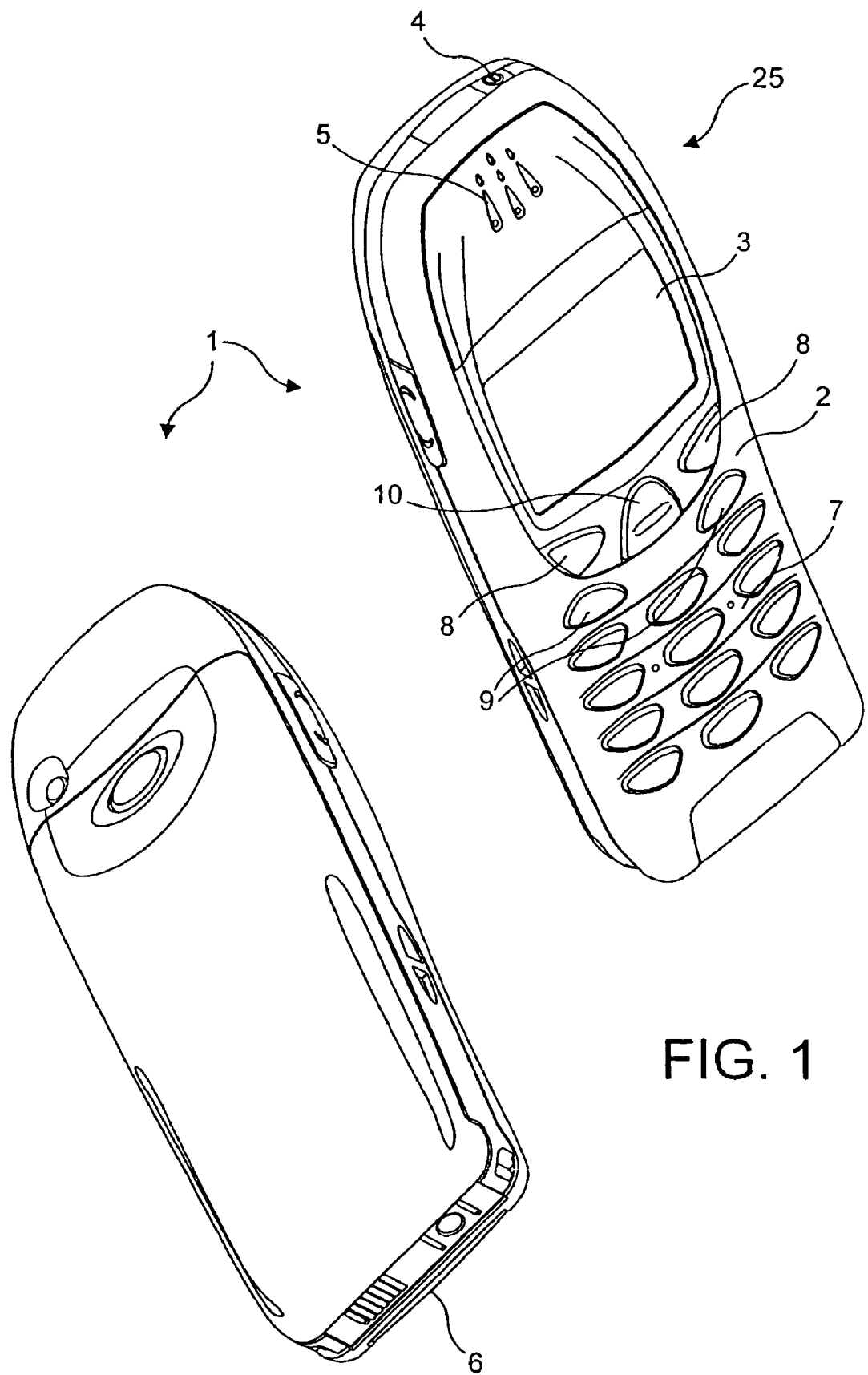
FIG. 1 schematically illustrates a preferred embodiment of a hand portable phone according to the invention.

FIG. 1 shows a preferred embodiment of a phone according to the invention, and it will be seen that the phone, which is generally designated by 1, comprises a user interlace having a keypad 2, a display 3, an on/off button 4, a speaker 5 (only openings are shown), and a microphone 6 (only openings are shown). The phone 1 according to the preferred embodiment communicates via a cellular network. When an in-coming call is detected, a buzzer 25 starts alerting.

According to the preferred embodiment, the keypad 2 has a first group 7 of keys as alphanumeric keys, two soft keys 8, and a navigation key 10. Furthermore the keypad includes two call-handling keys 9 for initiating and terminating calls. The present functionality of the soft keys 8 is shown in separate fields in the display 3 just above the keys 8. This key layout is characteristic of, for example, the Nokia 621 OTM phone.

Figure 2:
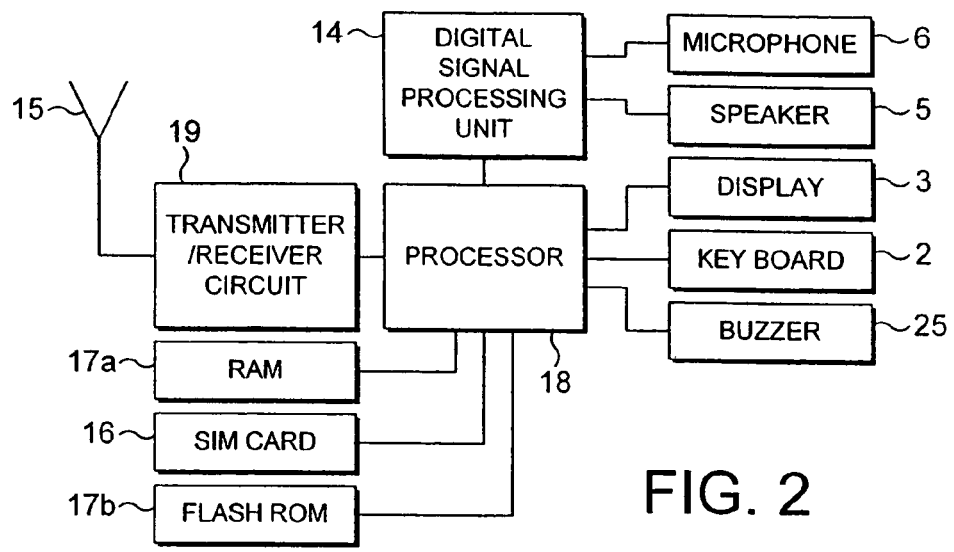
FIG. 2 schematically shows the essential parts of a telephone for communication with, for example, a cellular network.

FIG. 2 schematically shows the most important parts of a preferred embodiment of the phone, the parts being essential to the understanding of the invention. A processor 18, which for example supports the GSM terminal software, controls communications with the network via the transmitter/receiver circuit 19 and an antenna 15.

The microphone 6 transforms the user's speech into analogue signals; the signals formed thereby are A/D converted in an A/D converter (not shown) before the speech is encoded in an audio part (DSP) 14. The encoded speech signal is transferred to the processor 18. The processor 18 also forms the interface to a RAM memory 17a and a Flash ROM memory 17b, a SIM card 16, the display 3 and the keypad 2 (as well as data, power supply, etc.). The audio part 14 speech-decodes the signal, which is transferred from the processor 18 to the earpiece 5 via a D/A converter (not shown).

Figure 3:
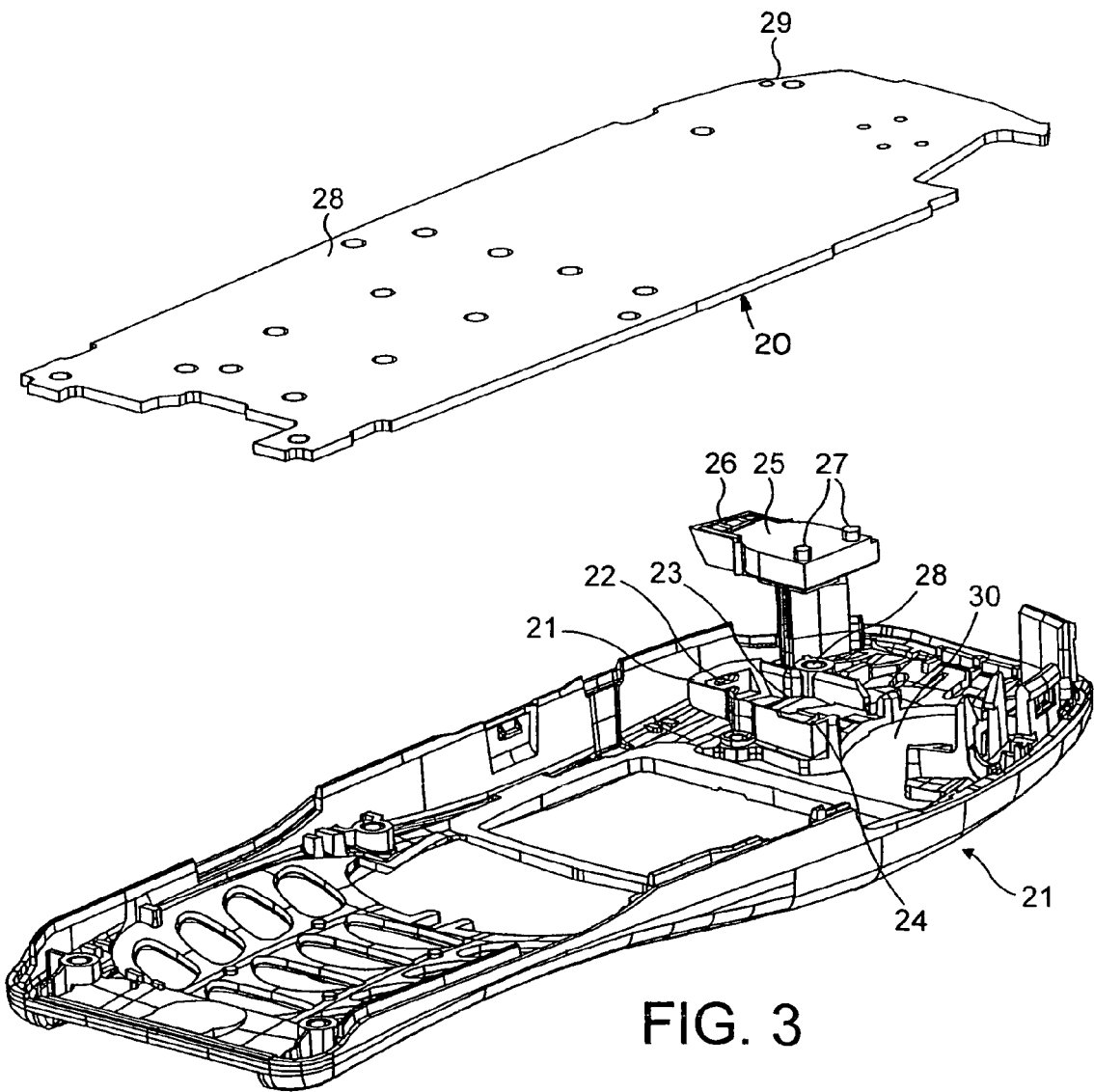
FIG. 3 shows a Printed Circuit Board, a buzzer and gasket assembly, and a front cover according to a preferred embodiment of the invention.

FIG. 3 shows a Printed Circuit Board (PCB) 20, a buzzer and gasket assembly including the buzzer 25 and rubber gasket 26. The components on the PCB 20 are not shown due to clarification reasons. The buzzer 25 is provided with two spring connectors 27 connecting the buzzer to connector pads (not illustrated) on the PCB 20. The invention is, according to the preferred embodiment of the invention, used in a cellular telephone, and the front cover 21 of the telephone is equipped with a recess 23 receiving the buzzer and gasket assembly. The recess 23 has a sealing surface 31 in one end and having some apertures 22 acting as passages for the buzzer sound through the housing wall. In the opposite end, the recess is provided is provided with two slanting 24 sides of the back ribs 32. The circular cut 30 receives the speaker 5 of the telephone.

The inclined wall part is in this embodiment provided by the two slanting 24 sides. The rubber gasket 26 has a flange 26 (FIG. 7) being glued to onto the bottom of the buzzer 25.

Figure 4:
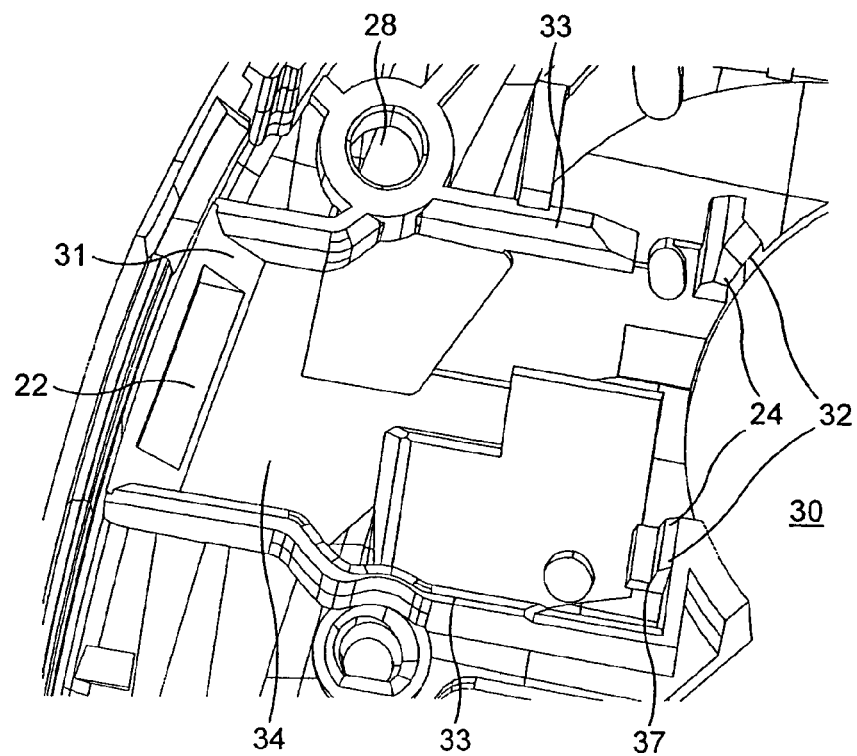
FIG. 4 shows in enlarged scale a recess of the buzzer cavity in the front cover shown in FIG. 3.

With reference to FIG. 4 is shown in enlarged scale that the recess of the buzzer cavity in the front cover and the recess has a "floor" or a base wall 34, two side walls 33, and a sealing wall 31.

Figure 5:
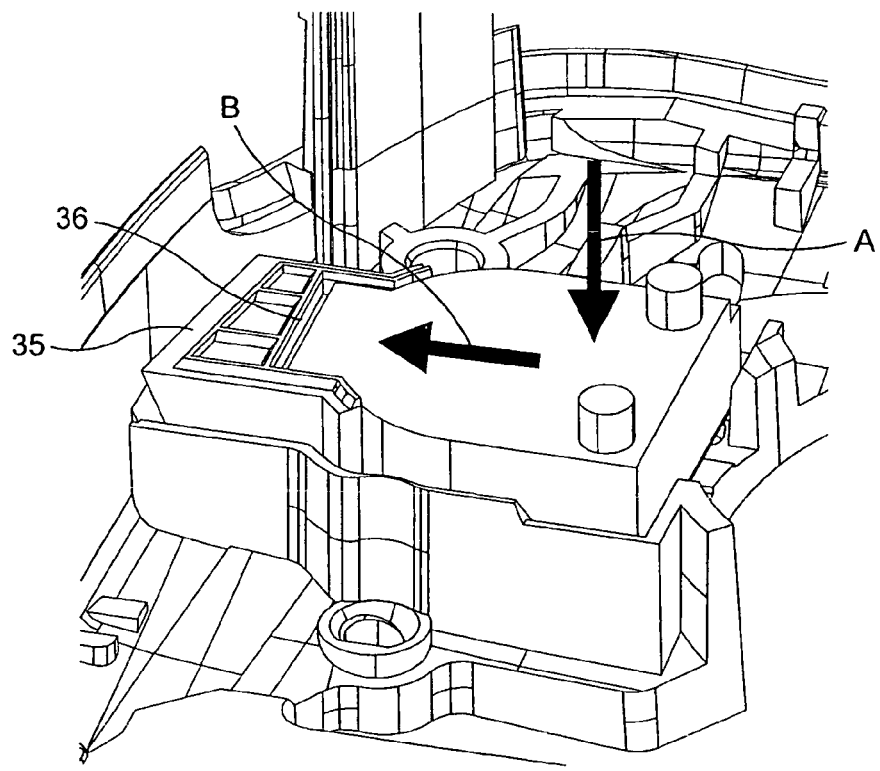
FIGS. 5 and 6 show in perspective view the recess of the buzzer cavity when the buzzer and gasket assembly is inserted according to a preferred embodiment of the invention.
Figure 6:
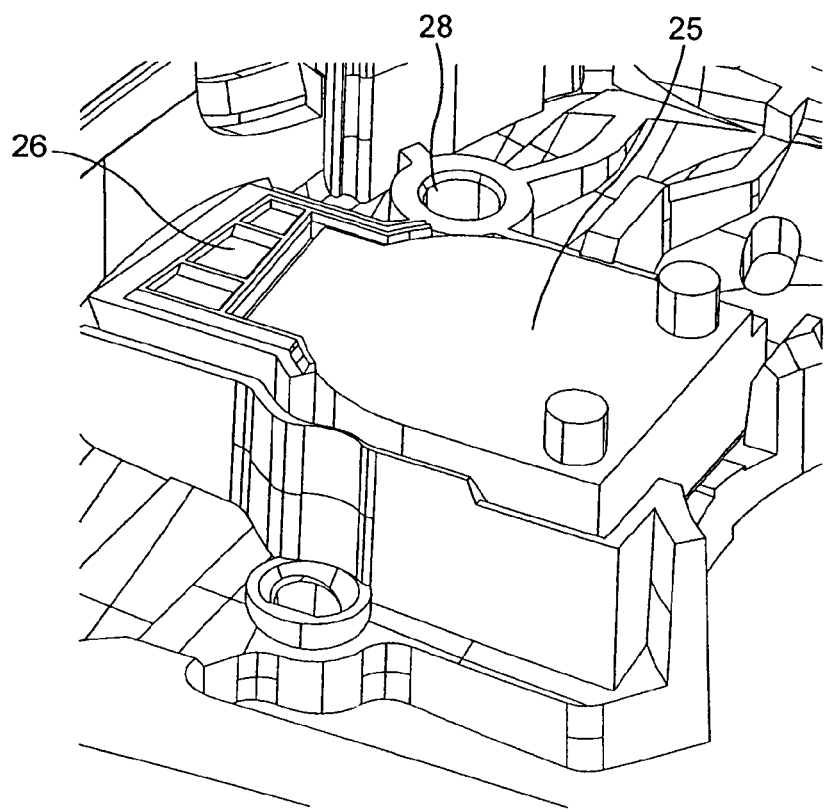

FIGS. 5 and 6 show in perspective view the recess of the buzzer cavity when the buzzer and gasket assembly is inserted according to a preferred embodiment of the invention. When assembling the telephone the buzzer and gasket assembly 25 and 26 are placed in a front cover 21, acting as a first housing part, and having a recess 23 for loosely receiving the buzzer and gasket assembly 25 and 26. The front cover 21 has in the recess an inclined wall part provided by the two slanting 24 sides of the back ribs 32. When placing the PCB 20 acting as a second housing part as a lid, the recess 23 is closed. By screwing a screw (not illustrated) through a bore 29 in the PCB 20 into a screw tower 28 in the front cover 21, the two housing parts will be biased towards each other in the direction indicated with the arrow A in FIG. 5. The inclined wall part 24 transfers a biasing force into a force (indicated with the arrow B in FIG. 5) acting on the resilient sealing gasket 26 in order to provide a sealing between the resilient sealing gasket 26 and the sealing surface 31 in which a sound passage is provided through the housing wall.

The buzzer 25 has one or more apertures through which an audio signal is passed. The gasket 26 provides preferably a channel having a rectangular cross-section guiding the acoustic energy from the buzzer apertures to the sound passage in the sealing surface 31.

Figure 7:
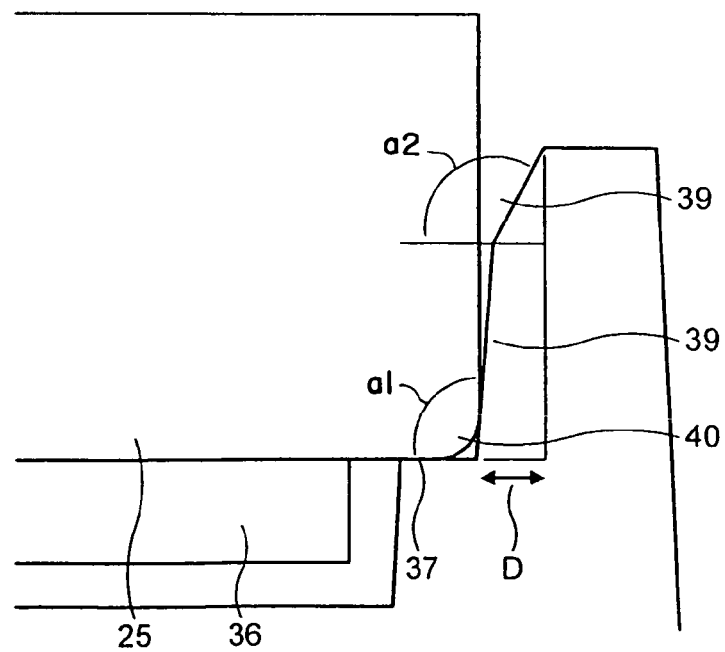
FIG. 7 shows a cross section of the inclined or slanted wall sections with the buzzer cavity when the buzzer and gasket assembly has been inserted into the cavity according to a preferred embodiment of the invention.

FIG. 7 shows a cross section of the inclined or slanted wall sections with the buzzer cavity when the buzzer and gasket assembly are inserted according to a preferred embodiment of the invention. The buzzer and gasket assembly is guided to a position where the buzzer 25 rests on a shoulder flange 37. During this guidance the buzzer 25 is biased towards the sealing surface 31. Hereby the rubber gasket 26 is compressed and a reliable sealing is obtained between the ends 35 and 36 of the gasket channels and the sealing surface 31 and the buzzer 25, respectively.

The angle $a_1$ of the base part of the inclined wall part 24 is here approximately 95°, while the top part of the inclined wall part 24 preferably may be angled approximately ($a_2$) 120° in relation to the floor of the recess. The distance D ensures that the buzzer travels a sufficient distance to cause the buzzer and gasket assembly to be placed loosely in the recess, and the gasket is biased between the sealing surface 31 and the buzzer 25, when the phone is assembled.

The end edge 40 of the buzzer 25 is rounded in order to ease the inserting.

What is claimed is:

1. A method of assembling an acoustic transducer assembly within a mobile cellular wireless telephone comprising:

placing an acoustic transducer body and a sealing gasket in a first housing part of the mobile cellular wireless telephone having a recess for receiving the acoustic transducer body and the sealing gasket, the first housing part including in the recess an inclined wall part;

moving a second housing part relative to the first housing part during assembly to cause the inclined wall part to contact the acoustic transducer body as a result of motion between the inclined wall part and the acoustic transducer body in the first direction to transfer a biasing force acting between the acoustic transducer body and the inclined wall part in the first direction into motion of the acoustic transducer body and into a force acting in the direction orthogonal to the first direction to provide a seal between the sealing gasket and a sound passage through the housing wall; and attaching the second housing part of the mobile cellular wireless telephone as a lid to close the recess.

2. A method according to claim 1, wherein an audio signal transferring channel provided by the resilient sealing gasket extends in a direction substantially perpendicular to the biasing force provided by the two housing parts.

3. A method according to claim 2, wherein the acoustic transducer body and the sealing gasket is shorter that a length of the acoustic transducer cavity, and the inclined wall part is provided opposite to the sound passage through the housing wall.

4. A method according to claim 3, wherein the angle between the inclined wall part and the base wall of the acoustic transducer cavity is largest in a top of the inclined wall part.

5. An acoustic transducer assembly within a mobile cellular wireless telephone comprising:

an acoustic transducer body within the mobile cellular wireless telephone having at least one aperture through which an audio signal is passed;

two housing parts within the mobile cellular wireless telephone which when assembled provide an acoustic transducer cavity for containing the acoustic transducer body and a sealing gasket, the acoustic transducer cavity including a sound passage through the housing wall;

the sealing gasket providing a channel for transferring the audio signal from the at least one aperture to the sound passage through the housing wall; and the housing parts during assembly are moved into engagement with each other to cause motion of the acoustic transducer body in a first direction producing contact with an inclined wall part of one of the housing parts which causes movement of the acoustic transducer body in a direction orthogonal to the first direction which transfers a biasing force acting in the first direction into a force in the direction orthogonal to the first direction acting on the acoustic transducer body to provide a seal between the sealing gasket and the sound passage through the housing wall.

6. An acoustic transducer assembly according to claim 5, wherein the acoustic transducer body includes a sound generating transducer, and the sound generating transducer provides an audio signal in response to a received input signal and the audio signal passes through the at least one aperture.

7. An acoustic transducer assembly according to claim 6, wherein the sound generating transducer is a buzzer for alerting.

8. A use of an acoustic transducer assembly according to claim 7 in a mobile telephone.

9. A use of an acoustic transducer assembly according to claim 6 in a mobile telephone.

10. An acoustic transducer assembly according to claim 5, wherein a first one of the two housing parts has a recess for receiving the acoustic transducer body and the sealing gasket, and a second one of the two housing parts is a lid for closing the recess during an assembling, and the acoustic transducer body and the sealing gasket is biased by an interlocking mechanism of the two housing parts.

11. A use of an acoustic transducer assembly according to claim 10.

12. An acoustic transducer assembly according to claim 10, wherein the audio signal transferring channel provided by the sealing gasket extends in a direction substantially perpendicular to the biasing force provided by the two housing parts.

13. A use of an acoustic transducer assembly according to claim 12.

14. An acoustic transducer assembly according to claim 12, wherein the acoustic transducer body and the sealing gasket is shorter that a length of the acoustic transducer cavity, and the inclined wall part is provided opposite to the sound passage through the housing wall.

15. A use of an acoustic transducer assembly according to claim 14.

16. An acoustic transducer assembly according to claim 14, wherein an angle between the inclined wall part and a base wall of the acoustic transducer cavity is in the range of 95–100°.

17. A use of an acoustic transducer assembly according to claim 16.

\* \* \* \* \*